United States Patent [19]

Baker

[11] Patent Number: 4,694,187
[45] Date of Patent: Sep. 15, 1987

[54] ELECTROMECHANICAL CONSTANT SPEED DRIVE GENERATING SYSTEM

[75] Inventor: Donal E. Baker, American Township, Allen County, Ohio

[73] Assignee: Westinghouse Electric Corp., Pittsburgh, Pa.

[21] Appl. No.: 818,466

[22] Filed: Jan. 13, 1986

[51] Int. Cl.⁴ .............................................. F02N 11/08
[52] U.S. Cl. ..................... 290/4 R; 290/4 C; 290/1 R; 322/28; 322/40; 310/112
[58] Field of Search ............. 290/1 R, 1 C, 4 R, 4 A, 290/4 B, 4 C, 4 D; 310/102 R, 112, 113, 114, 99; 318/156, 149, 157; 307/84, 8; 322/9, 10, 11, 28, 29, 30, 40

[56] References Cited

U.S. PATENT DOCUMENTS

| | | | |
|---|---|---|---|
| 1,413,158 | 4/1922 | Caple | 310/112 |
| 1,608,697 | 11/1926 | Jacobs | 310/112 |
| 1,610,666 | 12/1926 | Farrell | 310/112 |
| 1,785,965 | 12/1930 | Major | 310/112 X |
| 2,119,156 | 5/1938 | Finnegan et al. | 290/4 C |
| 2,223,703 | 12/1940 | Potez | 290/4 C |
| 2,463,349 | 3/1949 | Baner | 310/112 |
| 2,476,893 | 7/1949 | Mueller et al. | 310/112 X |
| 2,561,131 | 7/1951 | Oropeza | 310/112 |
| 2,597,357 | 5/1952 | McCormick | 322/28 |
| 2,784,332 | 3/1957 | Kober | 322/52 X |
| 2,872,591 | 2/1959 | Stineman | 307/84 X |
| 2,900,594 | 8/1959 | Bessiere | 310/99 X |
| 3,056,914 | 6/1958 | Potter | 322/40 |
| 3,562,567 | 2/1971 | Carini | 310/83 |
| 4,087,698 | 5/1978 | Myers | 307/84 |
| 4,330,743 | 5/1982 | Glennon | 290/46 X |
| 4,354,144 | 10/1982 | McCarthy | 318/149 X |
| 4,476,395 | 10/1984 | Cronin | 310/112 X |
| 4,481,459 | 11/1984 | Mehl et al. | 322/10 |
| 4,488,053 | 12/1984 | Cronin | 290/4 C |
| 4,498,014 | 2/1985 | Reyes | 290/1 R X |

Primary Examiner—William M. Shoop, Jr.
Assistant Examiner—Shik Luen Paul Ip
Attorney, Agent, or Firm—R. P. Lenart

[57] ABSTRACT

An electromechanical constant speed drive generating system is provided with a mechanical differential having first, second and third rotatable shafts, wherein the speed of the second shaft is equal to the speed of the first shaft multiplied by the first contant plus the speed of the third shaft multiplied by a second constant. The first shaft is coupled to an external engine and is driven at a variable speed ranging between predetermined lower and upper limits. A constant speed generator is connected to the second shaft for producing a constant frequency output. A power converter is electrically connected between the output of the constant speed generator and a variable speed dynamoelectric machine which is coupled to the third shaft, to transfer power between the output of the constant speed generator and the variable speed dynamoelectric machine, thereby controlling the speed of the dynamoelectric machine such that the speed of the second shaft remains substantially constant when the speed of the first shaft varies between the defined upper and lower speeds. The system can also be used to start the engine by operating the constant speed generator as a motor. Thus both start and generate modes of operation are possible.

11 Claims, 9 Drawing Figures

ELECTROMECHANICAL CONSTANT SPEED DRIVE GENERATING SYSTEM

BACKGROUND OF THE INVENTION

This invention relates generally to aircraft electric power generation systems, and more particularly, to such systems which include electromechanical components to perform a speed control function.

Aircraft electrical power generation systems which convert variable speed mechanical power produced by an aircraft engine into fixed frequency electrical power, fall into two basic categories. The first category includes constant speed drive generator systems in which a mechanical device is used to drive an electrical generator at a fixed speed, regardless of the speed of the prime mover. The constant speed generator, thus provides constant frequency power to the utilization loads.

The second category includes electronic power converters which are used to convert a generator's output to constant frequency electrical power. The generator can be connected directly to the engine, thus eliminating the mechanical constant speed drive. Such systems are referred to as variable speed constant frequency (VSCF) systems. Both types of systems are suitable for aircraft applications, however, each has advantages over the other.

Hydromechanical constant speed drives can cause severe transients and/or complete loss of power in zero gravity flight maneuvers. This is because the hydraulic system within the constant speed drive cannot properly sump the oil needed for the hydraulic drive motors. To overcome these deficiencies, the present invention combines features of systems in both categories in a unique manner to replace the hydraulic components in a constant speed drive system with electronic components to make an electromechanical constant speed drive.

SUMMARY OF THE INVENTION

An electromechanical constant speed drive generating system constructed in accordance with the present invention comprises a mechanical differential having first, second and third rotatable shafts, wherein the speed of the second shaft is proportional to the speeds of the first and third shafts. The first shaft is mechanically coupled to an external prime mover, such as an aircraft engine, which drives this first shaft at a variable speed having predetermined upper and lower limits. A constant speed generator is connected to the second shaft for producing a constant frequency output. A power converter is electrically connected between the output of the constant speed generator and a variable speed dynamoelectric machine which is connected to the third shaft, to transfer power between the constant speed generator output and the variable speed dynamoelectric machine, thereby varying the speed of the dynamoelectric machine such that the speed of the second shaft remains substantially constant when the speed of the first shaft is varied between the upper and lower speed limits. In the preferred embodiment, the power converter is a unidirectional device and the operating characteristics of the system components are chosen such that the dynamoelectric machine is also unidirectional and operates as either a motor or a generator throughout the predetermined operating speed range of the first shaft.

DESCRIPTION OF THE PREFERRED EMBODIMENT

Figure 1:
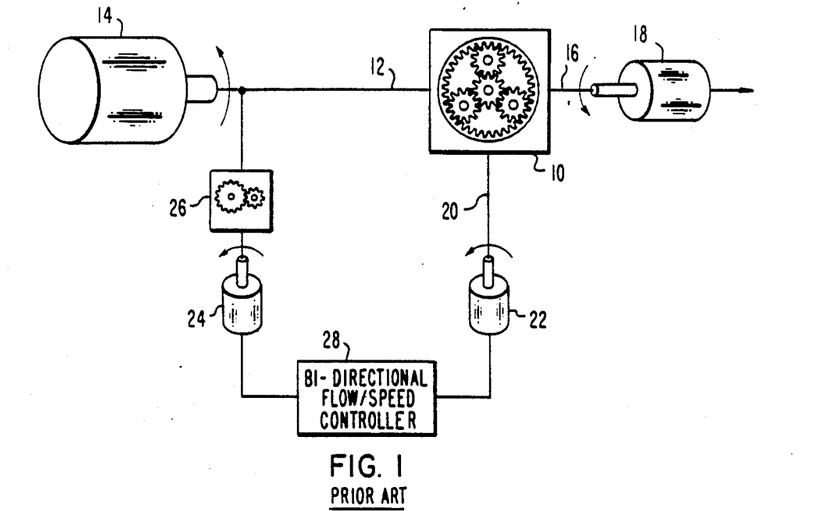
FIG. 1 is a block diagram of a prior art hydromechanical constant speed drive electric power generating system.

In order to efficiently describe the preferred embodiments of the present invention, it is instructive to first refer to the prior art hydromechanical constant speed drive generating system of FIG. 1. The heart of the system is a mechanical differential 10 which is used to compensate for variations in the input speed. This mechanical differential is a three-port gear box having a first shaft 12 coupled to an external prime mover such as an aircraft engine 14; a second shaft 16 coupled to a constant speed generator 18; and a third shaft 20 coupled to a variable speed hydraulic pump/motor 22. The mechanical differential is constructed such that the speed of the second shaft 16 is determined by the algebraic sum of the speeds of the first shaft 12 and the speed of the third shaft 20. This can be expressed as follows:

$$N1 + N3 = N2 \quad (1)$$

where N1 is the speed of shaft 12, N2 is the speed of shaft 16, and N3 is the speed of shaft 20. This equation assumes that shafts 12 and 20 are considered to be input shafts and shaft 16 is an output shaft. Since the specific design of the mechanical differential may be such that the gear ratios among the shafts are not 1:1:1, and more general version of equation (1) is:

$$K1*N1 + K3*N3 = N2 \quad (2)$$

where K1 and K3 are constants.

A second fundamental relationship for the mechanical differential 10 is, neglecting losses, that the sum of the input power on shafts 12 and 20, P1 and P3 respectively, is equal to the output power P2 on shaft 16. That is:

$$P1 + P3 = P2 \quad (3)$$

$$T1*N1 + T3*N3 = T2*N2 \qquad (4)$$

where T1, T2 and T3 represent torques on shafts 12, 16 and 20, respectively; N1, N2 and N3 represent the speeds of shafts 12, 16 and 20, respectively; and K1=K3=1. If all of the shafts are of the same sense, that is, all inputs or all outputs, then the sum of powers on all of the ports must be zero.

Continuing with the description of FIG. 1, a second variable speed pump motor 24 is connected to shaft 12 by way of a fixed ratio gear box 26. A bidirectional flow/speed controller 28 connects the variable speed pump/motors 22 and 24. When the system of FIG. 1 is running, the net power of the input shaft 12 and the compensating shaft 20 must equal the power on the output shaft 16. As the input speed changes, the speed of the compensation shaft 20 is controlled to a value which maintains a constant speed on the output shaft 16. The power required to drive the compensation shaft comes from the prime mover by way of a variable speed pump/motor arrangement which includes pump/motors 22 and 24 and the bidirectional flow/speed controller 28.

At one unique input speed, the desired output speed will be achieved wherein the compensation shaft speed is zero. The engine speed at which this occurs will be referred to as the cross-over speed.

At the cross-over speed, the shafts 12 and 16 power will be equal. Although no power will exist on the compensation shaft 20, it will have a torque associated with it. By virtue of equation (1), the direction of rotation of the compensation shaft 20 will be opposite for shaft 12 speeds above and below the cross-over speed. The torque will not change direction, however, so the power flow in the compensation shaft will be of opposite polarity above and below the cross-over speed due to the direction of rotation reversal.

Typically, the hydromechanical constant speed drive system is designed such that the cross-over speed is centered inside the normal operating speed range of the input shaft 12. This minimizes the power ratings and size of the hydraulic pumps and motors. This design requires the hydraulic loop to have bidirectional power flow capabilities. Since a hydraulic pump can also function as a motor, this does not represent a serious penalty in a hydraulic constant speed drive system.

A straightforward implementation of an electromechanical constant speed drive system may be accomplished by replacing the pump/motors 22 and 24 of FIG. 1 with variable speed motor/generators and by replacing the bidirectional flow/speed controller 28 of FIG. 1 with a bidirectional power converter. However, such a system would be subject to weight, size, cost, and reliability penalties when bidirectional requirements are imposed on the electric speed compensation loop. The present invention seeks to provide an electromechanical constant speed drive system which minimizes weight, maximizes reliability and provides a maximum number of possible features. Electromechanical constant speed drive systems offer the unique possibility of deriving the power required to operate the compensation shaft from the electrical output of the constant speed generator. This feature is not practical on hydraulic constant speed drive systems because another conversion, from electrical to hydraulic, would be required, thereby complicating the system. By contrast, taking the power from the constant speed generator electrical output to drive the compensation shaft yields a simplification over previous systems.

Figure 2:
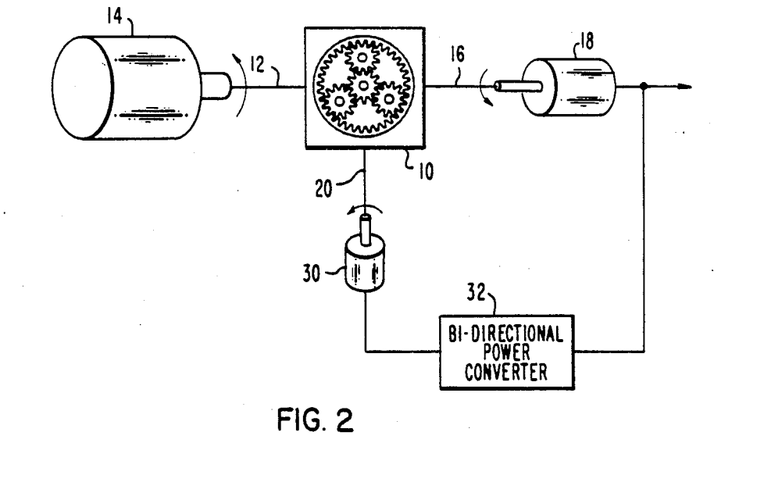
FIG. 2 is a block diagram of an electromechanical constant speed drive generating system constructed in accordance with one embodiment of the present invention.

FIG. 2 is a block diagram of an electromechanical constant speed drive generating system constructed in accordance with one embodiment of the present invention. The simplification achieved by this invention can be seen by comparing this system with the system of FIG. 1. Only one motor/generator 30 and one converter 32 are needed to drive the compensation shaft as compared to two motors and a converter in the other system.

By using a bidirectional converter as shown in FIG. 2, power of either polarity can be provided to drive the compensation shaft 20 over the entire operating range of the input shaft. Such a system, with bidirectional power flow capabilities and a cross-over speed centered in the normal operating range, will minimize the rating and sizes of the motor/generator and converter in a manner similar to that of the conventional hydromechanical constant speed drive system. However, bidirectional electronic power converters are generally less reliable than unidirectional converters since they must have twice the number of active switching devices, for example, transistors or SCRs, to provide the necessary reverse power flow capability.

Figure 3:
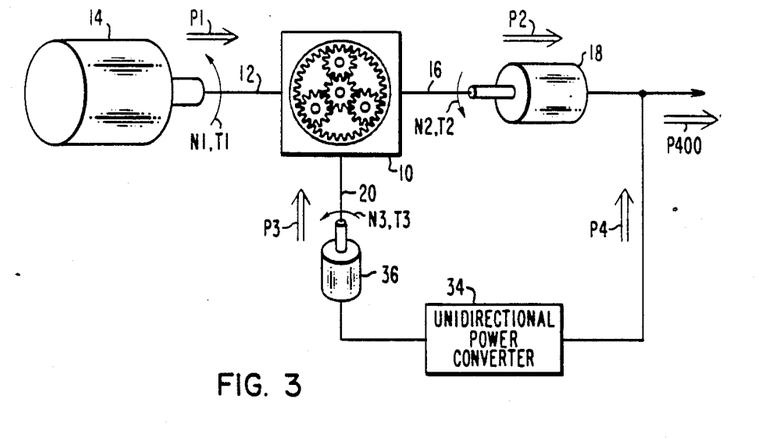
FIG. 3 is a block diagram of an electromechanical constant speed drive generating system constructed in accordance with an alternative embodiment of the present invention.

FIG. 3 is a block diagram of an alternative embodiment of the present inventin which provides unidirectional power flow in the compensation network and allows the use of a unidirectional electronic power converter 34. Such a system would allow the use of a conventional DC link VSCF inverter in the compensation branch. This inverter would be electrically connected between the output of the constant speed generator 18 and a variable speed generator 36 which is coupled to the compensation shaft.

The arrows in the block diagram of FIG. 3 illustrate the assumed direction of positive power flow for operation in the normal operating speed range. The magnitudes of the mechanical differential powers on shafts 12, 16 and 20 are defined as P1, P2 and P3, respectively. These powers are also equal to the speed-torque products N1*T1, N2*T2, and N3*T3, respectively. It will become apparent from the following discussion that unidirectional power flows out of the compensation shaft of the differential and that the dynamoelectric machine 36 will function as a generator.

Figure 4:
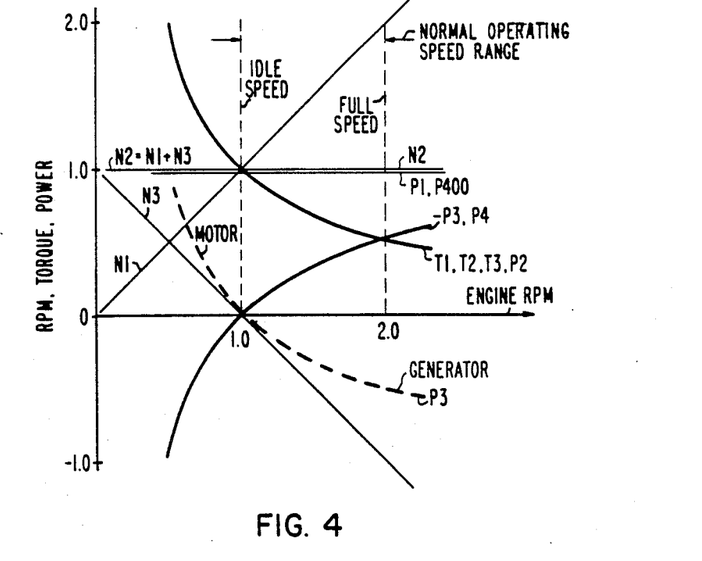
FIG. 4 is a series of curves which illustrate the operation of the system of FIG. 3.

The curves of FIG. 4 illustrate the operation of the system of FIG. 3 for the condition of full power (1.0 per unit) being delivered to 400 hertz utilization loads. This power level is defined as P400 and is not necessarily equal to P2. The combination of the differential gear box equations 1, 3 and 4 above the following equations completely describe the system as defined by FIG. 3.

$$P2 + P4 = P400 \qquad (5)$$

$$P4 = -P3 \qquad (6)$$

$$P1 = P400 \qquad (7)$$

P4 represents the power delivered by the unidirectional power converter and P400 represents the power delivered to a 400 hertz utilization load. In the curves of FIG. 4, all power, speed and torque values are in per unit values for the purpose of simplification. The differential is assumed to have 1:1:1 ratios between the shafts; that is, it is a normalized differential in which the constants K1 and K3 of equation (2) are equal to unity.

The relationship between the three individual shafts speeds is illustrated by curves N1, N2 and N3. Note that the graphical sum of N1 and N3 equals N2. At zero engine speed, the desired generator speed can be obtained only if the compensation shaft is motored at 1.0 per unit (full) speed. And conversely, with the engine at idle speed, the compensation shaft must be at zero speed, that is, the cross-over point.

It can be seen from the curves of FIG. 4 that the system normally operates above the cross-over speed with the compensation shaft running in the negative direction. Shafts 12 and 20 were initially defined as inputs, that is, having motors attached, with positive rotation and torque. Negative speed on shaft 20 indicates that shaft 20 is an output shaft. Hence, the speed compensation branch includes a unidirectional power converter 34 and a generator 36 attached to shaft 20.

The input power P1 and output power P400 are constant at 1.0 per unit and satisfy the assumption that the system load is fixed at 1.0 per unit. Therefore, these power curves are flat lines as shown by curves P1 and P400.

At the cross-over speed, all power required to drive the constant speed generator comes entirely from shaft 12 since the speed and power are both zero on shaft 20. The engine torque at this speed, which is the idle speed, can be found by dividing the power on shaft 12, $P1 = 1.0$ per unit, by its speed, $N1 = 1.0$ per unit, to obtain its torque, $T1 = 1.0$ per unit.

The engine torque at speeds other than idle has a 1/RPM relationship because the engine is delivering constant power for all speeds. This relationship is shown by the T1 curve.

For any given differential design, it can be shown that the torque ratios between all ports are fixed for all speed and torque conditions. The torque ratios are determined by the gear ratios (K1 and K3 in equation (2)) and are 1:1:1 for the system of FIG. 3. As a result, T1, T2 and T3 are identical and are shown by curves T1, T2 and T3 in FIG. 4.

Now that torque T2 is known for all speeds, its associated power can be determined. It is the product of the speed and torque, $N2 \times T2$, and is shown by curve P2. Note that the sum of power curves P1 and P3 equals P2 in agreement with equation (3), and that the sum of power curves P2 and P4 equals the output power P400 in agreement with equation (5).

Using the curves of FIG. 4, the power ratings for the components of the system of FIG. 3 can be determined. When operating within the normal speed range which is defined as the speed range ranging from a lower limit of 1.0 per unit to an upper limit of 2.0 per unit, the constant speed generator power P2 is seen to be 1.0 per unit maximum and 0.5 per unit minimum. Similarly, the compensation shaft power P3 is 0.0 per unit minimum and 0.5 per unit maximum.

The electromagnetic component ratings for the design of a system constructed in accordance with FIG. 3, with the cross-over speed set at idle speed, can now be summarized as: 1.0 per unit kVA for the constant speed generator; 0.5 per unit kVA for the variable speed generator 36; and 0.5 per unit kVA for a DC link inverter which serves as the unidirectional power converter 34.

In order to construct a differential for use in the systems of this invention, the required gear ratios K1 and K3, for each specific application, must be determined. Since two constants must be determined, two independent sets of conditions are required. By way of example, consider the following conditions:

1. At engine speed $N1 = 7000$ rpm, the compensation shaft speed N3 shall be zero, while the generator speed $N2 = 24,000$ rpm; and
2. At engine speed $N1 = 14,000$ rpm, the compensation shaft speed N3 shall be 24,000 rpm, while the generator speed N2 remains at 24,000 rpm.

Then, starting with the following equation:

$$K1 * N1 + K3 * N3 = N2 \tag{8}$$

where at $N3 = 0$;

$$K1 = N2/N1 \tag{9}$$

and where at $N1 = 0$;

$$K3 = N2/N3 \tag{10}$$

Then by substituting the first set of conditions into equation (8):

$$K1 * 7000 + K3 * 0 = 24,000 \tag{11}$$

Therefore, $K1 = 24/7$ and by substituting this value of K1 and the second set of conditions into equation (8):

$$(24/7) * 14,000 + K3 * 24,000 = 24,000 \tag{12}$$

so that $K3 = -1$.

Of course, a control system will be needed to control the speed compensation branch of the system. Such a control system would be a feedback control loop which changes the speed of the compensation shaft in relation to an error signal which is representative of the difference between the output frequency of the constant speed generator and a reference frequency. In aircraft applications, the reference frequency would be 400 hertz.

Figure 5:
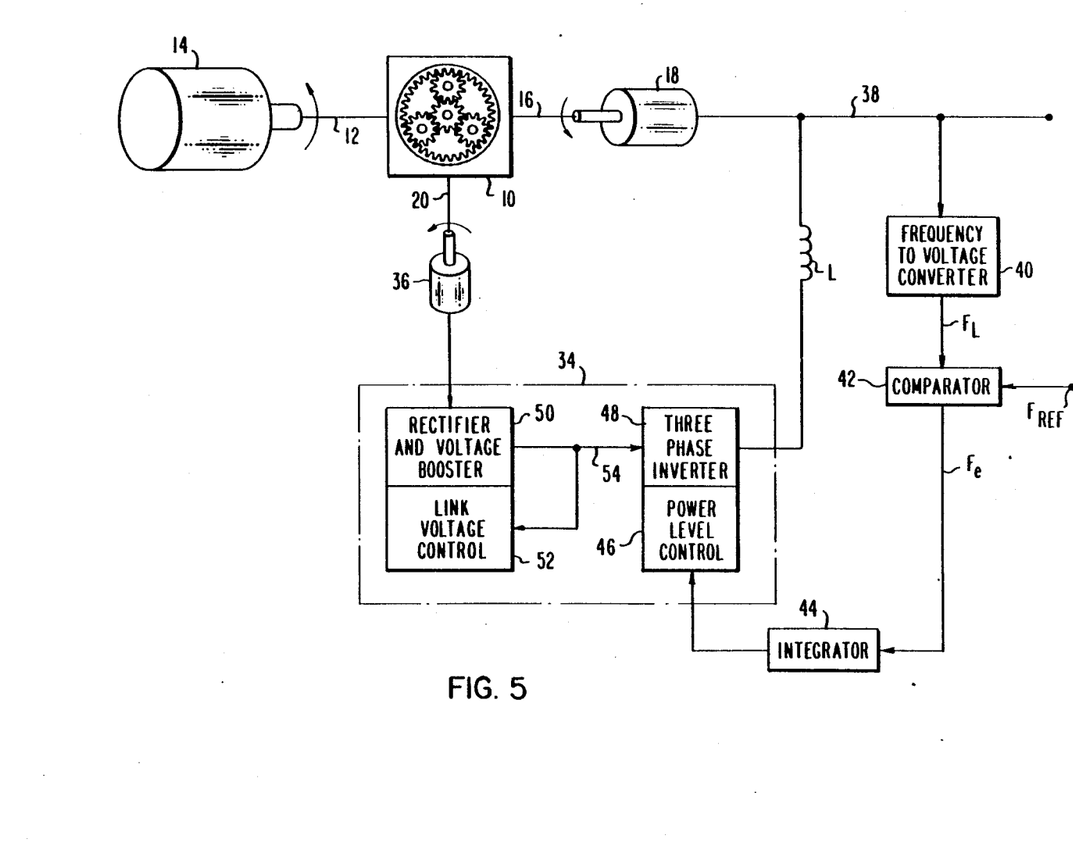
FIG. 5 is a block diagram of a control system to be used in combination with the generating system of FIGS. 3 and 4.

FIG. 5 is a block diagram of such a control system. The frequency of power on the 400 Hz power bus 38 is monitored by a frequency to voltage converter 40. The converter produces a signal $F_L$ which is representative of the monitored frequency. Signal $F_L$ is compared by a comparator 42 to a reference voltage signal $F_{Ref}$ which is representative of the desired 400 Hz system frequency. Any error between these signals results in an error signal $F_e$ which may be integrated by an optional integrator 44 and is then used by a power level control circuit 46 in the unidirectional power converter 34 to control the power delivered to the 400 Hz bus by the three-phase inverter 48 section of the converter 34. An inductive load sharing reactance L is connected between the inverter and the 400 Hz power bus.

Controlling the power delivered by the inverter also controls the power drawn from the compensation port via generator 36 which feeds a rectifier and voltage boost circuit 50. A link voltage control circuit 52 controls the voltage boost circuit to maintain the voltage on the DC link 54 within predetermined limits.

For example, if the system frequency drops below the reference frequency, then a positive error signal will increase the power delivered by the inverter and the compensation port generator. This in turn will increase the torque in the differential gear box and accelerate the main machine (constant speed generator) back to the desired speed (frequency).

There is a second effect which also acts to keep the main generator speed constant. That is, as the inverter power contribution increases, the main generator demand is reduced. This in turn reduces the main generator torque and helps keep speed constant. Thus the inverter power demand control has a doubling effect.

Of course, the converse case is true. If frequency is too high then inverter power is reduced and the main machine slows down to the desired speed.

The power delivered by the inverter is controlled via the relative phase angle of the inverter to the main generator.

Figure 6:
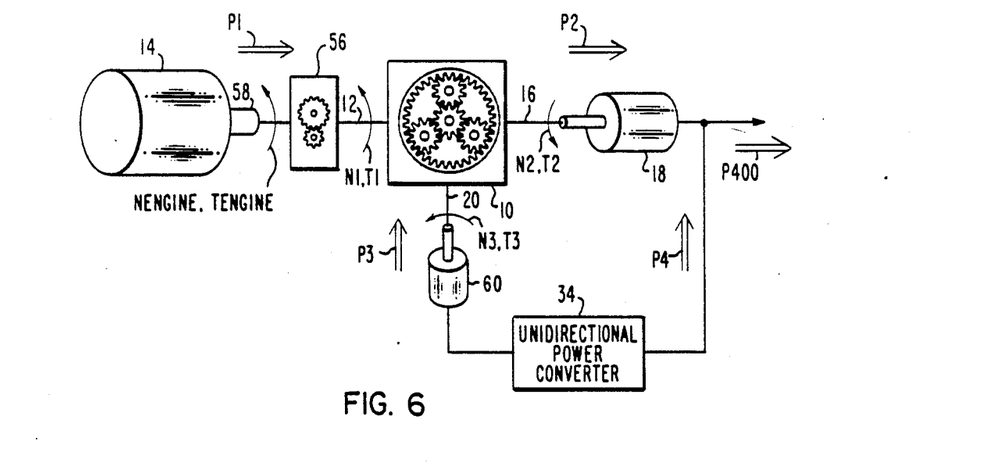
FIG. 6 is a block diagram of another alternative embodiment of the present invention.

FIG. 6 is a block diagram of another alternative embodiment of the present invention which is similar to the embodiment of FIG. 3 except that the cross-over speed is selected to be at the maximum engine speed rather than the idle speed. Arrows on the block diagram illustrate the assumed direction of positive power flow and are the same as that assumed for the FIG. 3 system.

Operation of the system of FIG. 6 is similar to that of FIG. 3, except that everything occurs at twice the engine speed. For simplicity purposes, a 2:1 fixed ratio gear box 56 has been inserted between the engine shaft 58 and the mechanical differential input shaft 12. The inclusion of this discrete gear box will permit analysis using a simple 1:1:1 differential as discussed above. Under these conditions, the relationships between the engine shaft and the input shaft 12 therefore become: Pengine=P1; Nengine=N1*2; and Tengine=$T\frac{1}{2}$. The remaining equations needed to completely define the system are identical to equations (1), (3), (4), (5), (6) and (7) as used to describe the system of FIG. 3.

Figure 7:
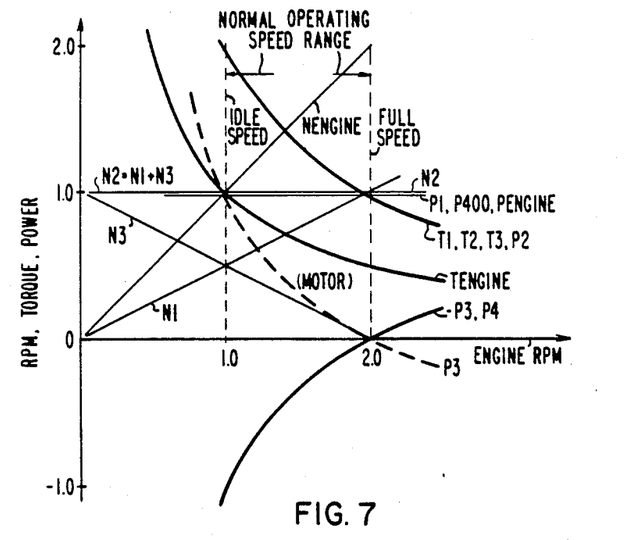
FIG. 7 is a series of curves illustrating the operation of the system of FIG. 6.

The curves of FIG. 7 illustrate the operation of the system of FIG. 6. Once again, per unit values of torque, speed and power have been used. The cross-over speed for the system of FIG. 6 has been selected to be full engine speed. The relationship between the three mechanical differential shaft speeds is illustrated by the curves N1, N2 and N3. Note that the graphical sum of N1 and N3 equals N2. The system normally operates below the cross-over speed with the compensation shaft 20 running in a positive direction, that is, in the motor mode rather than the generator mode. Therefore, a variable speed motor 60 has been inserted in the compensation branch in FIG. 5.

The input power P1 (and Pengine) and output power P400 are constant at 1.0 per unit, based on the assumption that the system load is 1.0 per unit. Therefore, these curves are flat lines as shown by curves P1, Pengine and P400. At the cross-over speed (full engine speed), all the power required to drive the constant speed generator comes from the input shaft 12 since speed and power are both zero on compensation shaft 20. The engine torque at this speed (full speed) can be found by dividing the engine power (1.0 per unit) by its speed (2.0 per unit) and obtaining Tengine=0.5 per unit.

The engine torque at speeds below full speed has a 1/RPM relationship because the engine is delivering constant power for all speeds. This relationship is shown by the Tengine curve. The gear box 56 between the engine shaft 58 and the mechanical differential input shaft 12 will cause the torque on shaft 12 to be twice the engine torque. This is illustrated by comparing curves Tengine and T1. Likewise, the speed ratio between the engine and shaft 12 is illustrated by comparing curves Nengine and N1.

As discussed above, the torque ratios between all ports of the differential are fixed for all speed and torque conditions. Since the additional gear box 56 is outside the differential, torques T1, T2 and T3 are identical as shown by the curves.

Now that the torque T2 is known for all speeds, its associated power can be determined. This power is the product of the speed N2 times the torque T2 and is shown by curve P2. Note that the sum of curves P1 and P3 equals P2 in agreement with equation (3).

Using the curves of FIG. 7, the power rating of the components for the system can be determined. When operating within the normal speed range, the constant speed generator power P2 is seen to be 2.0 per unit maximum and 1.0 per unit minimum. Similarly, the compensation port power P3 is 0.0 per unit minimum and 1.0 per unit maximum. Therefore, the electromagnetic component ratings for this design, with the cross-over speed set at maximum engine speed, can be summarized as: 2.0 per unit kVA for the constant speed generator 18; 1.0 per unit kVA for the variable speed motor 60; and 1.0 per unit kVA for the unidirectional power converter 34.

It is also desirable to have an aircraft power generation system which has the capability of engine starting. Various techniques have been considered for both the constant speed drive systems and the variable speed constant frequency systems. The present invention, as defined in FIG. 3, has engine start capability as illustrated by the operating curves in FIG. 8. The power flow arrows on the block diagram of FIG. 3 are consistent with the curves of FIG. 8.

Power flow in the start mode will, in fact, be reversed (negative) from the generate mode system of FIG. 4. This reversal of power flow is due to the reverse direction of torque on shafts 12 and 16, not the direction of rotation. The direction of rotation of shafts 12 and 16 are the same for both the generating mode and the starting mode of the system of FIG. 3. Therefore, the equations needed to completely define the start mode system are identical to those previously used to define the system of FIG. 3 in the generate mode.

Figure 8:
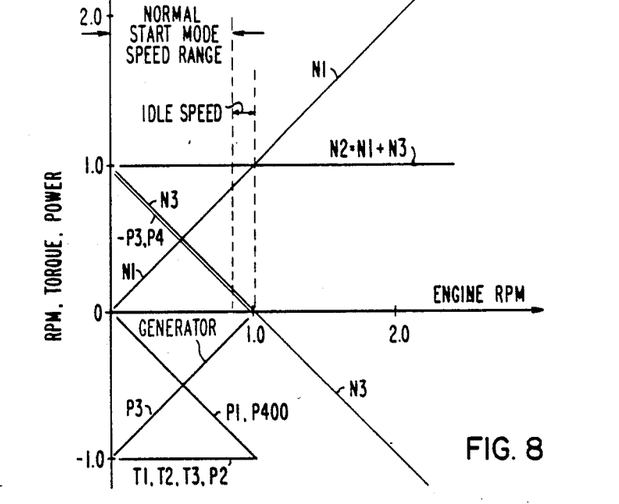
FIG. 8 is a series of curves illustrating the operation of the system of FIG. 3 when used in the engine start mode.

Once again, per unit values of torque, speed and power are used in the curves of FIG. 8. The differential is again assumed to have a 1:1:1 ratio between shafts so that the cross-over speed is at engine idle speed. The relationship between the three differential shaft speeds is illustrated by curves N1, N2 and N3 in FIG. 8. Note that the graphical sum of N1 and N3 equals N2. During operation in the start mode speed range, the system always operates below the cross-over speed with the compensation shaft 20 running in the positive direction, as illustrated by curve N3.

In the generator mode case of FIGS. 3 and 4, the compensation shaft rotated in the negative direction with positive torque. The result was negative power, or a compensation shaft which operated unidirectionally in the generate mode. In the starting mode, the compensation port operates with positive rotation and negative torque. This also results in negative power and the compensation shaft still operates unidirectionally in the generate mode. Thus the system of FIGS. 3 and 4 can provide start and generate modes of operation with no topology changes required in the compensation branch. This is a feature unique to the system defined by FIGS. 3 and 4 and is considered to be a significant advantage over the prior art.

During start, the torque to the engine is controlled to a constant value of 1.0 per unit by a control circuit. Therefore, the curves T1, T2 and T3 are a flat line as shown. The negative value of these torques implies that power is flowing from an external AC power source into the engine.

The constant speed generator 18 is operated as a synchronous motor and has a constant speed, N2, similar to the generator system of FIG. 3. Thus, the power P2 (N2*T2) for the constant speed machine is a flat line similar to T1, T2 and T3, and is shown by curve P2.

The power delivered to the engine (N1*T1) is proportional to speed as shown by curve P1. The difference between the fixed power on shaft 16 and the varying power out of shaft 12 appears on shaft 20. This power is delivered to the external 400 hertz source 62, in FIG. 9, by the unidirectional generator and converter. The net power drain from the 400 hertz source is the sum of P2 and P4 as shown by curve P400. This is in agreement with equation (5). This power is also equal to the power P1 delivered to the engine. Hence, this starting system will draw power or volt-amps from the AC power source in proportion to engine speed, that is, only the real power furnished to the engine. Initially, no power will be drawn from the 400 hertz source and the required power will increase as the engine accelerates. This is much better than cyclo-converter VSCF starter/generator systems which draw very large volt-amps from the source at very low power factor during the entire engine start cycle. Those systems cause distortion on the power bus and because of the large volt-amps, other loads cannot be connected to the 400 hertz source during the start cycle.

The curves of FIG. 8 illustrate that a 1.0 per unit rated system will crank an engine with 1.0 per unit torque. It is common practice to use the overload capability of starter/generator systems because the starting time is usually 30 seconds or less. Typically, aircraft generating systems have a 1.5 per unit, 5 minute overload capacity. Therefore, by using this derating, the starting torque capability of the system becomes 1.5 per unit.

The peak power ratings of the electromagnetic components of the starting system can be determined from the curves of FIG. 8. The constant speed generator, variable speed generator and converter each have peak powers of 1.0 per unit.

Thus, when operating in the start mode, the system of FIG. 3 will deliver 1.0 per unit starting torque (1.5 per unit if derating is used) if the component ratings are as follows: 1.0 per unit kVA for the constant speed generator; 1.0 per unit kVA for the variable speed generator; and 1.0 per unit kVA for the unidirectional power converter.

Figure 9:
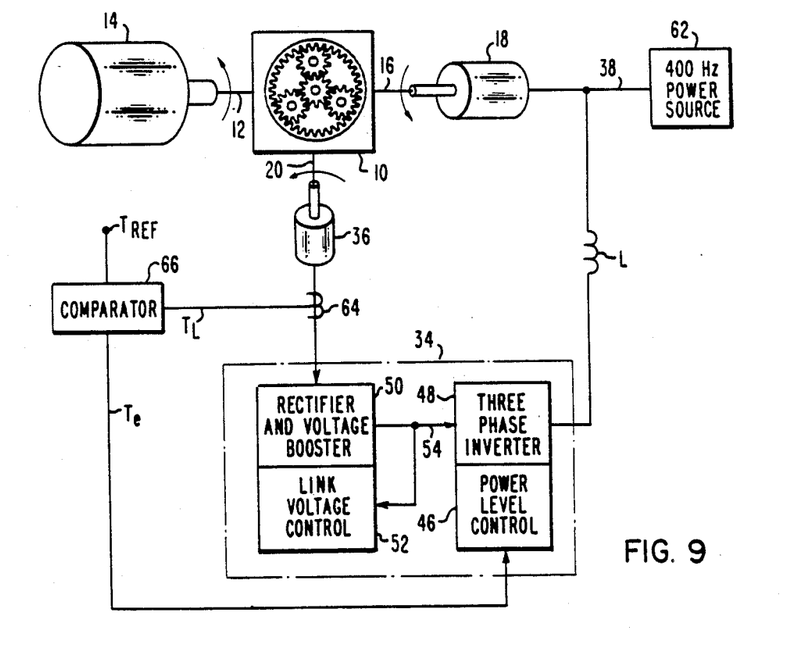
FIG. 9 is a block diagram of a control system to be used in combination with the system of FIG. 3 when used in the engine start mode.

FIG. 9 is a block diagram of a start mode control circuit which may be used in combination with this invention. An external 400 Hz power source 62 is connected to the 400 Hz power bus 38 to operate the constant speed generator as a synchronous motor. The output current of the compensation generator 36 is monitored by current transformer 64 to produce a torque signal $T_L$. This torque signal $T_L$ is compared by comparator 66 to a voltage reference signal $T_{Ref}$, representative of the desired torque on the engine shaft. The difference between the $T_L$ and $T_{Ref}$ signals results in a torque error signal $T_e$ which is used to control the power output level from the three phase inverter section 48 of the unidirectional power converter 34.

It should be noted that the system of FIG. 6 which has a cross-over speed at the maximum engine speed will not work in the start mode with a unidirectional power flow compensation branch. This is because the start mode will always produce power at the compensation shaft, no matter where the cross-over speed is located. That power can be dissipated (or circulated) only through a generator connected to that shaft. This is in conflict with the power consuming mode that the system of FIG. 6 requires when operating as a power generator system, thereby requiring a motor connected to the compensation shaft.

This is not considered to be a severe penalty because the system of FIG. 6 requires much higher rated and heavier components than the system of FIG. 3. The FIG. 3 system is therefore considered to be the preferred approach.

It should be understood that all of the above analysis was based on an ideal situation with no losses. In reality, ratings will be somewhat higher to account for this assumption. Similarly, the cross-over speeds will, in a practical system, not be set exactly at engine idle or maximum speed since some RPM will be needed to produce voltage when operating near those points. This too, will increase the component ratings somewhat.

Although the present invention has been described in terms of what are at present believed to be its preferred embodiments, it will be apparent to those skilled in the art that various changes may be made without departing from the scope of the invention. It is therefore intended that the appended claims covers such changes.

What is claimed is:

1. An electromechanical constant speed drive generating system comprising:
   a mechanical differential having first, second and third rotatable shafts, wherein the speed of said second shaft is equal to the speed of said first shaft multiplied by a first constant plus the speed of said third shaft multiplied by a second constant;
   means for driving said first shaft at a variable speed ranging from a lower predetermined speed to an upper predetermined speed;
   a constant speed generator connected in a driving relationship with said second shaft, for producing a constant frequency output;
   a variable speed dynamoelectric machine connected in a driving relationship with said third shaft;
   a unidirectional power converter electrically connected between the output of said constant speed generator and said variable speed dynamoelectric machine to transfer unidirectional power between the output of said constant speed generator and said variable speed dynamoelectric machine, thereby varying the speed of said variable speed dynamoelectric machine such that the speed of said second shaft remains substantially constant when the speed of said first shaft is varied between said lower and upper predetermined speeds.

2. An electromechanical constant speed drive generating system as recited in claim 1, wherein:
   said dynamoelectric machine operates as a motor when the speed of said first shaft is varied between said lower and upper predetermined speeds.

3. An electromechanical constant speed drive generating system as recited in claim 2, wherein:
   the speed of said dynamoelectric machine approaches zero as the speed of said first shaft approaches said upper predetermined speed.

4. An electromechanical constant speed drive generating system as recited in claim 1, wherein:
   said dynamoelectric machine operates as a generator when the speed of said first shaft is varied between said lower and upper predetermined speeds.

5. An electromechanical constant speed drive generating system as recited in claim 4, wherein:
the speed of said dynamoelectric machine approaches zero as the speed of said first shaft approaches said lower predetermined speed.

6. An electromechanical constant speed drive generating system as recited in claim 1, further comprising:
means for producing a first signal representative of an output from said variable speed dynamoelectric machine;
means for comparing said first signal with a reference frequency signal and for producing an error signal in response to the difference between said first signal and said reference frequency signal; and
said unidirectional power converter being responsive to said error signal to control said dynamoelectric machine and thereby reduce the difference between the first signal and the reference frequency signal.

7. An electromechanical constant speed drive generating system comprising:
a mechanical differential having first, second and third rotatable shafts, wherein the speed of said second shaft is equal to the speed of said first shaft multiplied by a first constant plus the speed of said third shaft multiplied by a second constant;
means for driving said first shaft at a variable speed ranging from a lower predetermined speed to an upper predetermined speed;
a constant speed generator connected in a driving relationship with said second shaft, for producing a constant frequency output;
a variable speed dynamoelectric machine connected in a driving relationship with said third shaft;
a bidirectional power converter electrically connected between the output of said constant speed generator and said variable speed dynamoelectric machine to transfer bidirectional power between the output of said constant speed generator and said variable speed dynamoelectric machine, thereby varying the speed of said variable speed dynamoelectric machine such that the speed of said second shaft remains substantially constant when the speed of said first shaft is varied between said lower and upper predetermined speeds.

8. An electromechanical constant speed drive generating system as recited in claim 7, wherein:
the speed of said dynamoelectric machine approaches zero as the speed of said first shaft is about midway between said lower predetermined speed and said upper predetermined speed.

9. An electromechanical constant speed drive generating system as recited in claim 7, further comprising:
means for producing a first signal representative of an output from said variable speed dynamoelectric machine;
means for comparing said first signal with a reference frequency signal and for producing an error signal in response to the difference between said first signal and said reference frequency signal; and
said bidirectional power converter being responsive to said error signal to control said dynamoelectric machine and thereby reduce the difference between the first signal and the reference frequency signal.

10. An electromechanical system for starting an aircraft engine comprising:
a mechanical differential having first, second and third rotatable shafts, wherein the speed of said second shaft is equal to the speed of said first shaft multiplied by a first constant plus the speed of said third shaft multiplied by a second constant;
means for coupling said first shaft to an aircraft engine;
a first dynamoelectric machine connected in a driving relationship with said second shaft;
means for connecting said first dynamoelectric machine to an external source of constant frequency AC power;
a second dynamoelectric machine connected in a driving relationship with said third shaft;
a unidirectional power converter electrically connected between said source of AC power and said second dynamoelectric machine, such that during starting of said engine, said first dynamoelectric machine rotates at a constant speed and said second dynamoelectric machine acts as a generator to supply power to said AC power source.

11. An electromechanical system for starting an aircraft engine as recited in claim 10, wherein:
the speed of said second dynamoelectric machine approaches zero as said aircraft engine approaches idling speed.

* * * * *